US008899782B2

(12) United States Patent
Sikkens et al.

(10) Patent No.: US 8,899,782 B2
(45) Date of Patent: Dec. 2, 2014

(54) LIGHTING SYSTEM AND LIGHT SOURCE UNIT FOR SUCH A SYSTEM

(75) Inventors: Marten Sikkens, Nuenen (NL); Marcel De Jong, Eindhoven (NL); Martinus Petrus Creusen, Wijlre (NL); Silvia Maria Booij, Eindhoven (NL); Josef Andreas Schug, Wuerselen (DE)

(73) Assignee: Koninkljke Philips N.V., Eindhoven (NL)

( * ) Notice: Subject to any disclaimer, the term of this patent is extended or adjusted under 35 U.S.C. 154(b) by 105 days.

(21) Appl. No.: 13/638,142

(22) PCT Filed: Mar. 23, 2011

(86) PCT No.: PCT/IB2011/051214
§ 371 (c)(1),
(2), (4) Date: Sep. 28, 2012

(87) PCT Pub. No.: WO2011/121488
PCT Pub. Date: Oct. 6, 2011

(65) Prior Publication Data

US 2013/0051014 A1 Feb. 28, 2013

(30) Foreign Application Priority Data

Mar. 31, 2010 (EP) .................................... 10158554

(51) Int. Cl.

| | |
|---|---|
| ***F21V 1/00*** | (2006.01) |
| ***G02B 27/00*** | (2006.01) |
| ***F21S 8/10*** | (2006.01) |
| ***F21V 13/04*** | (2006.01) |
| *F21Y 101/02* | (2006.01) |
| *F21W 131/406* | (2006.01) |
| *F21Y 103/00* | (2006.01) |

(52) U.S. Cl.
CPC ............ *F21V 13/04* (2013.01); *F21Y 2101/02* (2013.01); *F21W 2131/406* (2013.01); *F21Y 2103/003* (2013.01); *F21S 48/1388* (2013.01); *F21S 48/1241* (2013.01); *F21S 48/1154* (2013.01)
USPC ............................ 362/235; 359/626; 362/507

(58) Field of Classification Search
USPC ................ 362/235, 507, 464–468, 506, 508, 362/236–243, 545, 543
See application file for complete search history.

(56) References Cited

U.S. PATENT DOCUMENTS

| | | | |
|---|---|---|---|
| 6,339,506 | B1 | 1/2002 | Wakelin |
| 6,909,554 | B2 | 6/2005 | Liu |

(Continued)

FOREIGN PATENT DOCUMENTS

| | | | |
|---|---|---|---|
| DE | 102004020493 | A1 | 11/2005 |
| EP | 1357332 | A2 | 4/2003 |
| EP | 1388707 | A2 | 2/2004 |
| EP | 2037167 | A2 | 3/2009 |

*Primary Examiner* — Joseph L Williams
(74) *Attorney, Agent, or Firm* — Yuliya Mathis

(57) ABSTRACT

A lighting system is disclosed which includes a light source unit and a projection system for producing a desired light distribution pattern in a target area, especially for use in an automotive head lighting, studio and theater lighting, indoor spots with adjustable beam width or direction, architectural dynamic lighting, disco lighting and other. The lighting system is especially suitable for a light source unit having one or more Lambertian light sources, especially a plurality of LEDs. For generating a desired light distribution pattern in the target area, the light source unit may include a plurality of collimators that are configured especially such that the curved focal plane (P) of the projection system intersects with or tangentially touches the exit apertures of the collimators.

16 Claims, 5 Drawing Sheets

(56) References Cited

U.S. PATENT DOCUMENTS

| | | | |
|---|---|---|---|
| 7,375,312 | B2 | 5/2008 | Butterworth |
| 7,410,282 | B2 | 8/2008 | Eichelberger |
| 7,581,860 | B2 | 9/2009 | Bogner |
| 8,152,346 | B2 | 4/2012 | Yasushi |
| 2003/0202359 | A1 | 10/2003 | Albou |
| 2006/0285341 | A1 | 12/2006 | Yatsuda et al. |
| 2007/0091630 | A1 | 4/2007 | Eichelberger |
| 2007/0211473 | A1 | 9/2007 | Peck |

LIGHTING SYSTEM AND LIGHT SOURCE UNIT FOR SUCH A SYSTEM

FIELD OF THE INVENTION

The invention relates to a lighting system comprising a light source unit and a projection system, for producing a desired light distribution pattern in a target area, especially for use in automotive head lighting, studio and theatre lighting, indoor spots with adjustable beam width or direction, architectural dynamic lighting, disco lighting and other. Especially, the invention relates to a lighting system comprising a light source unit having one or a plurality of Lambertian light sources (i.e. light sources having a pattern of the radiated light intensity which is substantially proportional to the cosine of the angle between an observer and a centerline or surface normal in which the light source lies), especially one or a plurality of LEDs or an LED array or a light emitting area, e.g. in the form of one or a plurality of apertures of one or a plurality of light guides, having such a Lambertian radiation characteristic. Finally, the invention relates to a light source unit comprising one or a plurality of Lambertian light sources, which light source unit is adapted for use in such a lighting system.

BACKGROUND OF THE INVENTION

U.S. Pat. No. 6,909,554 discloses an optical system that includes an array of opto-electronic devices in the form of an array of light emitters like LEDs or an array of light detectors like CCDs, wherein the array is substantially extending along a planar plane. Further, the optical system includes an array of micro lenses and a fore optic having a non planar focal field. Each opto-electronic device is provided with one of the micro-lenses which each have a focal length and/or a separation distance between them and their respective opto-electronic device such that it compensates for the non planar focal field of the fore optic, so that light which is provided by the fore optic is reconfigured by the micro-lenses to be substantially focused along the planar plane of the array of opto-electronic devices, and vice versa.

One disadvantage of this optical system is that in case of using LEDs as light emitting opto-electronic devices, a great part of the emitted light cannot be captured by the related micro-lens but is lost. This is due to the fact, that an LED is usually a Lambertian light source having a pattern of the radiation intensity which is more or less proportional to the cosine of the angle between the observer and the centerline or surface normal in which the LED lies.

US 2007/0211473 discloses a light source especially for traffic lights and other signal heads, comprising a housing in which an LED module is positioned for emitting light through a Fresnel lens and a spreading lens to the outside of the housing, wherein an improved uniformity of the light distribution across the surface of the spreading lens shall be achieved by positioning around each LED a reflector cup having either a tilt angle such that more light is directed toward the outer perimeter of the spreading lens, or having a non symmetrical curvature or being fanned out in order to achieve the effect of the tilted reflector cup without tilting the same.

SUMMARY OF THE INVENTION

One object underlying the invention is to provide a lighting system comprising a light source unit and a projection system, by means of which a desired or predetermined light distribution pattern can be generated in a target area with a high efficiency especially in case of using one or a plurality of Lambertian light sources. Another object underlying the invention is to provide a lighting system comprising a light source unit and a projection system, which lighting system is especially suitable for automotive head lighting applications for generating an appropriately shaped illumination pattern on a road, especially in case of using one or a plurality of Lambertian light sources.

These objects are solved according to claim 1 by a lighting system comprising a light source unit and a projection system for generating the said predetermined or desired light pattern in a target area, wherein the light source unit comprises at least one light source and at least one collimator comprising an entry aperture through which light emitted by the at least one light source enters the collimator and planar or curved light reflecting walls or planes for reflecting and directing the light entered into the collimator through an exit aperture of the collimator and into the projection system, wherein the at least one collimator is dimensioned and/or arranged such that either the exit aperture of the collimator, or at least one of front rims of the light reflecting walls or planes of the collimator which enclose and mark the boundary of the exit aperture of the collimator is at least substantially coincident with and at least substantially follows at least a part of a curved focal plane of the projection system, or is dimensioned and/or arranged such that the curved focal plane of the projection system intersects with or tangentially touches the exit aperture or at least one of the rims, respectively.

By arranging the aperture of a collimator or at least one of the front rims limiting such an aperture in the curved focal plane of the projection system as indicated above, a continuous distribution of the light intensity in the target area can be obtained with a high efficiency but without substantial aberrations, so that the lighting system according to the invention does not considerably suffer from field curvature of the projection system.

The dependent claims disclose advantageous embodiments of the invention.

Due to the fact, that collimators with reflecting walls are used for directing the light into the projection system instead of refractive lenses, also Lambertian light sources like LEDs can be used according to claim 2 without considerable loss of the emitted light.

The solution according to claim 1 is advantageous especially in case of the embodiment according to claim 3 in which the light source unit comprises a plurality of collimators because also the light emitted by those collimators which have a considerable distance from the optical axis of the projection system is directed into the target area with a high efficiency, or, in other words, a much more sharp and at least substantially aberrations-free image of the whole light source unit and consequently a more homogeneous distribution of the light intensity pattern can be obtained in the target area.

Claims 4 to 6 disclose advantageous embodiments of collimator arrangements if a plurality of such collimators is provided.

The embodiment according to claim 7 is especially advantageous if the light sources shall be mounted on a common printed circuit board.

Claims 8 and 9 are directed on embodiments of the invention, by which a sharp cut-off edge can be obtained in the light distribution pattern in the target area.

Claims 10 and 11 are directed on embodiments of the invention, by which a gradual decrease of the light intensity in the light distribution pattern in the target area can be obtained.

The embodiment according to claim 12 is advantageous for generating a certain course of the pattern of the light intensity distribution in the target area.

Claims 13 and 14 disclose embodiments of the light source units themselves which are advantageous with respect to their manufacturing.

It will be appreciated that features of the invention are susceptible to being combined in any combination without departing from the scope of the invention as defined by the accompanying claims.

Further details, features and advantages of the invention will become apparent from the following description of preferred and exemplary embodiments of the invention which are given with reference to the drawings.

DETAILED DESCRIPTION OF EMBODIMENTS

Figure 1:
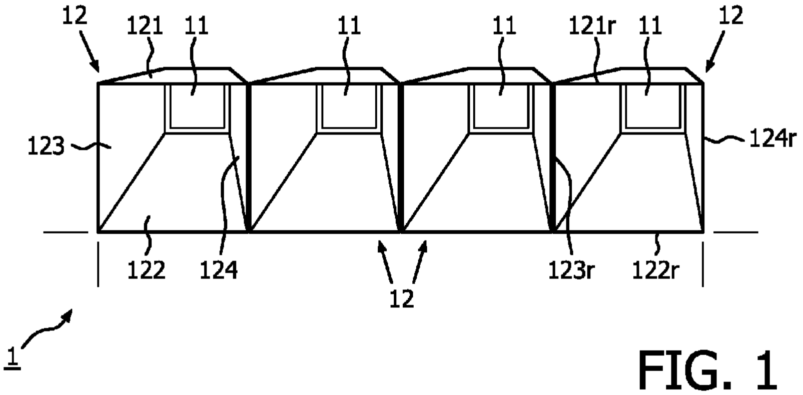
FIG. 1 shows a schematic three-dimensional view of a light source unit according to the invention.

FIG. 1 shows a schematic view of a light source unit 1 according to the invention. It comprises a plurality of LEDs 11 and a plurality of collimators 12, wherein each collimator 12 has an entry aperture at which each at least one LED 11 is arranged, and an exit aperture, through which the light emitted by the at least one LED 11 leaves the collimator 12. Instead of the LEDs 11 themselves, other light emitting surfaces like the end(s) of one or more light guides like a fiber optic, especially having a similar pattern of the light radiation intensity as an LED, could be provided in the entry aperture of the collimator 12, for guiding the light of one or more light sources like LEDs into this entry aperture.

Generally, the collimators 12 are either reflective collimators which are filled with air, for collimating the light emitted by the LEDs only by reflection at the inner surfaces of the walls of the collimators 12, or the collimators 12 are filled with a transparent dielectric medium in order to collimate the light emitted by the LEDs not only by reflection but also by refraction within the dielectric medium, each into the direction of the projection system, especially its entry aperture.

Preferably, the exit apertures of the collimators 12 are each rectangular because this allows a close positioning of the collimators 12 side by side according to FIG. 1, and a more homogeneous distribution of the light emitted by the whole light source unit 1 is obtained in comparison to collimators having e.g. a circular exit aperture. For ease of manufacturing, the entry aperture of the collimators 12 is as well rectangular. Correspondingly, the LEDs 11 or the other light emitting surfaces are provided such that they have a rectangular light emitting surface as well, and the area of the entry aperture of the collimators 12 corresponds with respect to its extensions to the extensions of this light emitting surface, and vice versa.

Preferably, a small gap is provided between the entry aperture of the collimators 12 and the LEDs 11 in order to allow a positioning tolerance between both.

More specifically, as indicated in FIG. 1, each collimator 12 has an upper wall 121, a lower wall 122 and a first and an opposite second side wall 123, 124, wherein the exit aperture of each collimator is enclosed and limited by the front rims *121r*, *122r*, *123r*, *124r* (i.e. the rims which are opposite to the projection system) of its walls 121, 122, 123, 124, respectively. In other words, the light reflecting walls or planes 121 to 124 are bounded or terminated in the direction towards the projection system by the front rims *121r* to *124r*, and these front rims enclose and mark the boundary of the exit aperture of the related collimator 12.

Preferably, the area of the exit aperture is about four times the area of the entry aperture (or of the related LED die within the aperture) in order to obtain a collimation opening angle of about 30° for matching a f/1.0 projection system, wherein f is the f-number which is the ratio between the lens diameter D and the focal length f of the projection system, so that in this case D=f.

According to FIG. 1, the light source unit 1 comprises a number of preferably identical collimators 12 which are directed in parallel to each other and arranged adjoining side by side along a straight line array. Alternatively, a light source unit 1 according to the invention can also be provided in the form of a matrix array having a number of such lines of collimators 12 above and below each other, wherein these lines being arranged in parallel to each other and adjoining each other side by side, wherein these lines can have the same or different lengths.

Figure 2:
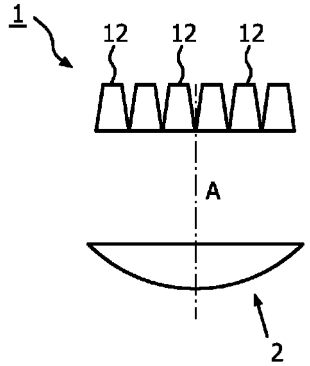
FIG. 2 shows a plan view onto a general configuration of a lighting system comprising a light source unit according to FIG. 1 and a projection system.

FIG. 2 shows a plan view onto a general configuration of a lighting system comprising a light source unit 1 according to FIG. 1 and a projection system 2 which is usually provided in the form of one or more lenses.

The light source unit 1 (i.e. the line array or the matrix array of collimators 12 as explained above) extends along a planar plane perpendicular to the optical axis A of the projection system 2. The light emitted by the light source unit 1 is projected by means of the projection system 2 into a target area. Since the apertures of the collimators 12 of such a light source unit 1 are arranged more or less in the same one common planar plane which is at least substantially perpendicular to the optical axis A of the projection system 2, such a configuration suffers from the field curvature or the non planar but curved focal field or focal plane of the projection system 2 which causes unsharpness and other aberrations especially for those LEDs and collimators 12 which have a significant distance from the optical axis A of the projection system 2. This effect is very prominent for projection systems 2 consisting of only one single lens element.

Generally, in order to compensate the above curvature of the focal plane, the individual collimators 12 of the light source unit 1 are arranged and/or directed and/or dimensioned according to the invention such that the exit apertures of the individual collimators 12, and preferably the center of these exit apertures, or at least one of the front rims of the light reflecting walls of the collimators which enclose and mark the boundary of the exit aperture of the related collimator 12, are positioned as close as possible on or are coincident with and follow or intersect or tangentially touch the curved focal plane P of the projection system 2. This has the consequence, that the exit apertures of the collimators 12 are imaged accordingly much more sharply into the target area so that a continuous light distribution without considerable loss of light is achieved.

Generally, when imaging the exit apertures of the collimators 12 of a light source unit 1 into a target area, dark vertical lines corresponding to the rims 124*r*, 123*r* between adjacent side walls 124, 123 of neighboring collimators 12 could also be generated in the target area. In order to avoid these lines or make them less visible, if desired, the neighboring side walls 124, 123 between the adjacent individual collimators 12 can be made shorter in comparison to the upper and the lower wall 121, 122 in order to keep these rims 124*r*, 123*r* out of the focal plane of the projection system 2. By this, the LEDs 11 would have an accordingly smaller distance from each other in a lateral direction in comparison to the case of FIG. 1 in order to keep the opening angle of the collimators 12 unchanged. The same accordingly applies if a matrix of collimators 12 is provided and possible horizontal lines are generated in the target area due to adjacent rims 121*r*, 122*r* between an upper and a neighboring lower wall 121, 122 of collimators which are arranged above and below each other.

On the basis of the above principles, the following exemplary embodiments of the invention are given which can be selected according to a desired application and the related needs.

Figure 3:
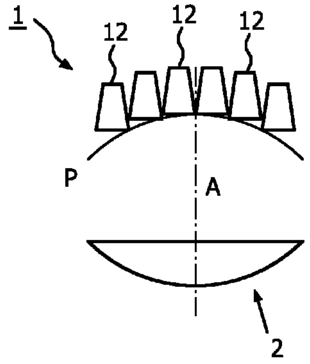
FIG. 3 shows a plan view onto a first embodiment of a lighting system according to the invention.

FIG. 3 shows a plan view onto a first embodiment of a lighting system according to the invention, comprising a light source unit 1 and a projection system 2. The light source unit 1 can be provided by a plurality of collimators 12 which are arranged along a straight line (line array), or in the form of a number of such lines of collimators 12 being arranged parallel to each other (matrix array), both projected into a plane perpendicular to the optical axis A of the projection system 2, and adjoining each other with equal or varying lengths of the line arrays as explained in connection with FIGS. 1 and 2. The above positioning of the exit apertures in the curved focal plane P is obtained according to FIG. 3 by accordingly shifting the individual collimators 12 parallel to each other and in a direction parallel to the optical axis A of the projection system 2 according to the curvature of the focal plane P. By this, the exit apertures of the collimators 12 are also accordingly shifted in relation to each other but remain in planes perpendicular to the optical axis A of the projection system, so that the focal plane P intersects or tangentially touches the plane of the apertures of the collimators 12 or the front rims 121*r*, 122*r*, 123*r*, 124*r* of the walls 121, 122, 123, 124, respectively, of the collimators 12 as indicated by the dotted line P (which indicates the focal plane) in FIG. 3.

However, this solution may have a practical disadvantage, because the entry apertures of the collimators 12 are now as well positioned in a curved plane but no longer in a common planar plane. If the LEDs 11 are each positioned in these entry apertures, they can no longer be mounted on a common printed circuit board because such a board is usually planar.

Figure 4:
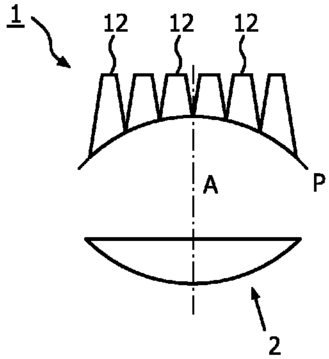
FIG. 4 shows a plan view onto a second embodiment of a lighting system according to the invention.

In order to avoid this disadvantage, a second embodiment of a lighting system is provided according to FIG. 4. The light source unit 1 can again be provided in the form of a straight line array of collimators 12, or in the form of a number of parallel and adjoining such lines with equal or varying lengths (especially in the form of a matrix array of collimators 12), both seen in a plane perpendicular to the optical axis A of the projection system 2 as explained in connection with FIGS. 1 and 2. Further, a projection system 2 is again schematically shown in FIG. 4 and can be provided in the form of one or more lenses.

According to this second embodiment, the collimators 12 are not shifted as indicated in FIG. 3, but the lengths of the walls 121 to 124 of the collimators 12 are each extended in the direction towards the projection system 2 up to the curved focal plane P. By this, the exit apertures which are each delimited by the front rims 121*r* to 124*r* of these walls 121 to 124, are substantially coincident with and substantially follow the curved focal plane P of the projection system 2. The front rims 121*r* to 124*r* themselves can each form a straight line, or, for an even better adaptation to the focal plane P, are provided with a curvature which is at least substantially matched to the curvature of the focal plane P.

The entry apertures of the collimators 12 and accordingly the related LEDs 11 at these entry apertures remain in a common planar plane, so that the LEDs can be mounted on a common printed circuit board.

Figure 5:
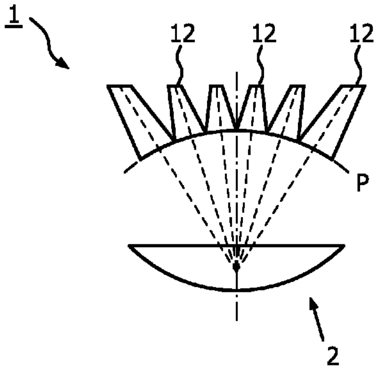
FIG. 5 shows a plan view onto a third embodiment of a lighting system according to the invention.

FIG. 5 shows a plan view onto a third embodiment of a lighting system according to the invention comprising a light source unit 1 and a projection system 2. The light source unit 1 can again be provided as explained above in connection with FIG. 4 in the form of a line array or a matrix array of collimators 12, and the projection system 2 can again be provided in the form of one or more lenses.

According to this third embodiment the collimators 12 are tilted in relation to the optical axis A of the projection system 2 such that especially the center of the light beams which leave the exit apertures of the collimators 12 are each aimed at a center area or an entry aperture of the projection system 2. In this embodiment, the exit apertures of the collimators 12 are again arranged in and substantially follow the curved focal plane P of the projection system 2. The front rims 121*r* to 124*r* themselves can again each form a straight line, or, for an even better adaptation to the focal plane P, are provided with a curvature which at least substantially matches the curvature of the focal plane P.

In order to enable that the LEDs 11 which are positioned at the entry apertures of the collimators 12 can be mounted on a common printed circuit board, the collimators 12 are preferably extended with respect to their length in the direction away from the focal plane P such that all entry apertures are positioned in a common planar plane which is preferably perpendicular to the optical axis A of the projection system 2.

This third embodiment is advantageous and has an improved efficiency especially in case of a large light source unit 1 comprising collimators 12 having a considerably large distance from the optical axis A of the projection system 2.

Figure 6:
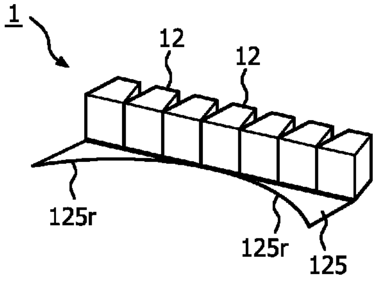
FIG. 6 shows a three-dimensional view of a light source unit of a fourth embodiment of a lighting system according to the invention wherein a projection system is not shown.

FIG. 6 shows a three-dimensional view of a light source unit 1 of a fourth embodiment of the invention wherein the projection system is not indicated in this Figure for clarity reasons only. This fourth embodiment is especially provided for applications in which a beam with a sharp cut-off edge of the light intensity pattern is desired to be generated in the target area. For example, such a lighting system can be used in an automotive head lighting system in order to avoid blinding the oncoming traffic. In such a case it is desired that in the target area the light intensity above a horizontal cut-off edge is considerably reduced in comparison to the light intensity below the horizontal cut-off edge.

The collimators 12 of such a light source unit 1 are arranged preferably along a straight line (line array of collimators 12 as indicated in FIG. 6), or in the form of a number of parallel and adjoining such lines with equal or varying lengths (especially in the form of a matrix of collimators 12) wherein the apertures of the collimators 12 are preferably arranged in a common planar plane perpendicular to the optical axis A of the projection system 2 as explained above in connection with FIGS. 1 and 2. In order to generate the above mentioned horizontal cut-off edge at the upper side of the beam in the target area, the light source unit 1 comprises at and along a corresponding lower side or edge of the exit apertures of the collimators 12 a first reflective shield 125 which extends between the collimators 12 and the projection system 2. This first reflective shield 125 is oriented, dimensioned and curved such that its front rim 125*r* (i.e. the rim which is arranged opposite to the projection system) is coincident with and substantially follows the curved focal plane P of the projection system 2, so that the rim 125*r* is sharply imaged in the form of the horizontal cut-off edge into the target area. Preferably, the first reflective shield 125 extends in a horizontal direction, i.e. perpendicular to the first and the second side walls 123, 124 of the collimators 12.

Due to the fact that in contrast to the embodiments as shown in FIGS. 3 to 5, the apertures of the collimators 12 according to FIG. 6 preferably extend along a substantially straight line and in a plane perpendicular to the optical axis A of the projection system 2, the above mentioned lower side or edge of the array of collimators 12 at which the first reflective shield 125 is arranged (and by this the front rims 122*r* of the lower walls 122 of the collimators 12) touches the focal plane P of the projection system 2 at most at its central portion (i.e. according to FIG. 6 only the front rim 122*r* of the lower wall 122 of the central collimator 12 coincides with the focal plane), or the lower side or edge of the array of collimators 12 (and consequently all front rims 122*r* of the lower walls 122 of the collimators 12) does not at all touch the focal plane P of the projection system 2 but are distant from the focal plane P.

Due to the resulting fact that (in contrast to FIGS. 3 to 5) the exit apertures of most or all of the collimators 12 are distant from the focal plane P of the projection system 2, the exit apertures especially of the outer collimators 12 which are also distant from the optical axis A of the projection system 2 are more or less out-of-focus of the projection system 2 and will accordingly be projected out-of-focus into the target area. However, especially in case of automotive applications, this might be tolerated or may even be desirable in order to obtain a certain degree of decrease of the light intensity in a direction sideward in the target area.

Figure 7:
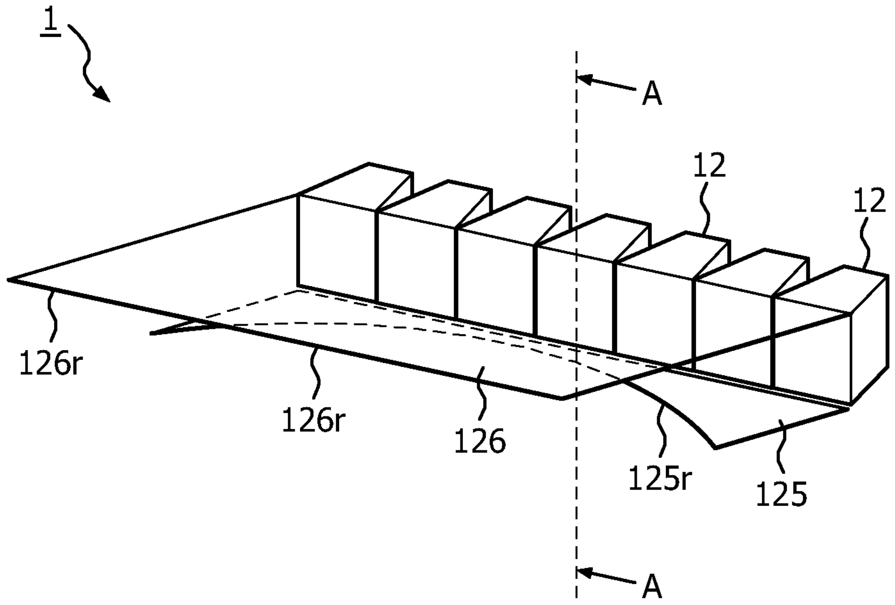
FIG. 7 shows a three-dimensional view of a light source unit of a fifth embodiment of a lighting system according to the invention wherein a projection system is not shown.

FIG. 7 shows a light source unit 1 of a fifth embodiment of the invention which is a variant of the fourth embodiment shown in FIG. 6. This fifth embodiment is especially provided for applications in which a beam with a more or less gradual decrease of the light intensity in a certain direction in the target area is desired, e.g. a decrease beginning at a sharp cut-off edge generated by means of the first reflective shield 125 (if any) and continuing in a direction away from this cut-off edge. This is especially desirable in an automotive low beam system or other automotive head lighting systems as well.

In order to obtain this, the fifth embodiment differs from the fourth embodiment in a second reflective shield 126 which is provided at the upper edge of the light source unit 1 (i.e. at the edge opposite to the edge at which the first reflective shield 125 is arranged) if the decrease is desired in a direction downward in the target area. The second reflective shield 126 is e.g. directed such that it straightly continues the direction in which the upper walls 121 of the collimators 12 extend. However, other directions or inclinations can be selected as well in dependence on the desired progression or gradient of the decrease of the light intensity. The light source unit 1 can again be provided in the form of a line or matrix array of collimators 12 as explained above, and the collimators 12 are again arranged as explained above with reference to FIGS. 1, 2 and 6.

Figure 8:
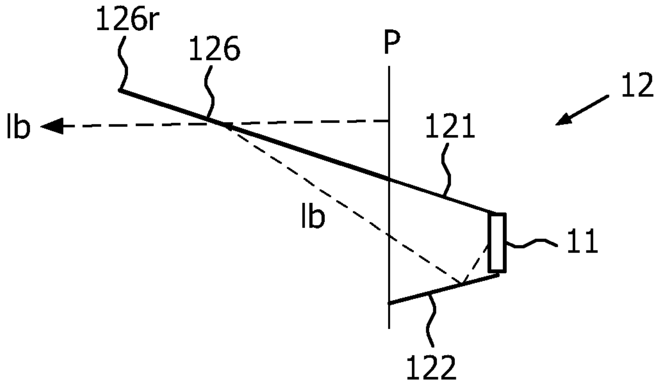
FIG. 8 shows a schematic cross section through the light source unit according to FIG. 7 indicating light rays emitted by one of the LEDs.

FIG. 8 shows a cross section through the light source unit 1 of the fifth embodiment according to FIG. 7 along the line A-A in FIG. 7 through the central collimator 12, i.e. a cross section in a plane along the optical axis A of the projection system 2 and in a vertical direction according to FIG. 7, wherein it is assumed that the projection system 2 is arranged such that the focal plane of the projection system 2 is again coincident with the front rim 125*r* of the first reflective shield 125, i.e. arranged as explained above with reference to FIG. 6.

In FIG. 8, the upper and the lower wall 121, 122 of a collimator 12 is shown, and at its entry aperture an LED 11 is schematically indicated. The second reflective shield 126 preferably extends with the same or another inclination as the upper walls 121 of the collimators 12 and by this continues the upper walls 121 in the same or in another direction. Further, the second shield 126 extends clearly beyond the focal plane P in the direction to the projection system 2 so that its front rim 126*r* is positioned between the focal plane P and the projection system 2. Due to the fact that the course of the curved front rim 125*r* of the first reflective shield 125 at the central collimator 12 substantially reaches the front rim 122*r* of its lower wall 122, this first reflective shield 125 is not indicated in FIG. 8.

Further, FIG. 8 indicates an exemplary light beam 1*b* (dotted line) originating from the LED 11 which shows that there will be light reflections at this second shield 126 which in the target area seem to originate from a position below the image of the exit aperture of the collimator 12.

By this, the light distribution in the target area will show a more or less gradual decrease of the light intensity, beginning at the sharp cut-off edge and continuing in a direction downward from this cut-off edge (which is generated by means of the first reflective shield 125).

Alternatively, the fifth embodiment according to FIG. 7 can also be provided without the first reflective shield 125 if the cut-off edge is not desired in the target area. In this case, the collimators 12 are preferably directed and their exit apertures are preferably arranged in and follow the curved focal plane P such as it has been explained above with respect to the embodiments shown in FIG. 3 or 4 or 5.

Figure 9:
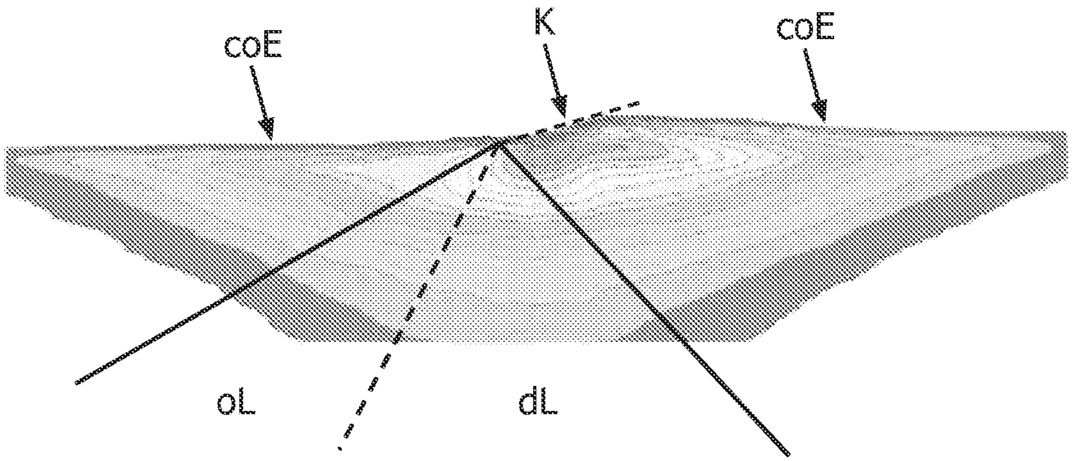
FIG. 9 shows a desired light pattern of an automotive head lighting on a road.

FIG. 9 schematically shows a pattern of the distribution of the light intensity of an automotive head lighting system in relation to a road when the related vehicle is driving in right-hand traffic on a right driving lane dL, wherein an opposite lane oL for the oncoming traffic is indicated as well.

Apart from the cut-off edge coE which is desired in such a pattern and which is generated by means of the fourth embodiment as shown in FIG. 6, it is usually desired to have a so called kink K along this cut-off edge coE at which the cut-off edge coE rises in an upward direction to the right (in the view of a vehicle driver) and then remains in an elevated position in relation to and substantially parallel to the cut-off edge coE left of the kink K.

Figure 10:
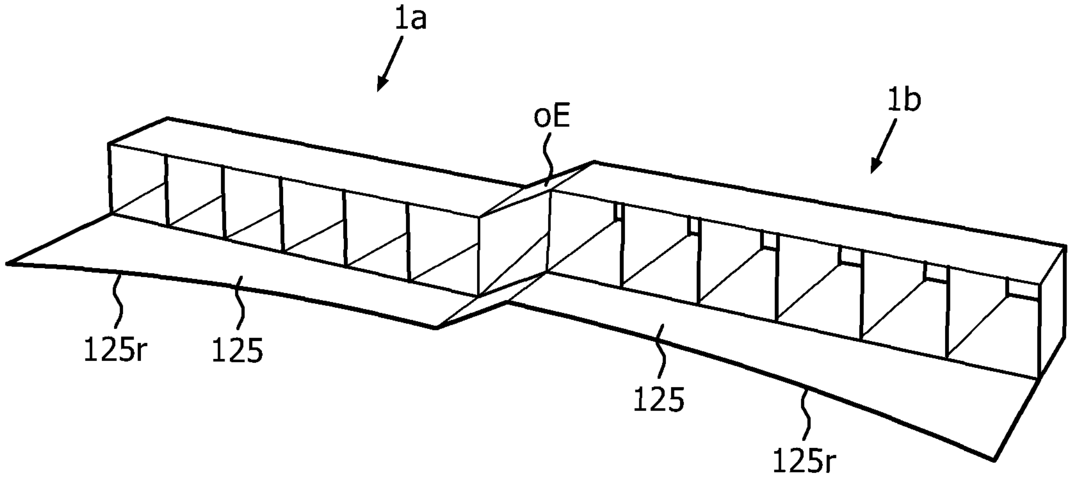
FIG. 10 shows a schematic three-dimensional view of a light source unit of a sixth embodiment of a lighting system according to the invention, for generating the light pattern according to FIG. 9 wherein a projection system is not shown.

FIG. 10 shows a light source unit 1 of a sixth embodiment of the invention which is provided for generating such a kink K along the cut-off edge coE. A projection system is again not indicated for clarity reasons only.

In FIG. 10, the light source unit (which comprises the collimators 12 and the LEDs 11) comprises a first lower portion 1*a* and a second elevated portion 1*b* and is schematically indicated together with the optional first reflective shield 125 at the lower edge of the light source unit. The second reflective shield 126 according to FIG. 7 can of course be provided also with this sixth embodiment (if desired) but is not shown here for clarity reasons.

In order to realize the above kink K in the cut-off edge coE of the light distribution pattern, the sixth embodiment differs from the embodiments shown in FIGS. 2 to 7 in an offset edge oE which is provided along the light source unit 1*a*, 1*b* and by which the light source unit is divided into the first lower portion 1*a* and the second elevated portion 1*b*. These portions 1*a*, 1*b* extend along parallel lines, and the second portion 1*b* is elevated in a direction perpendicular to the optical axis A of the projection system 2 and perpendicular to the extension of the first portion 1*a* of the light source unit. The length and the inclination of the offset edge oE is dimensioned such that the desired length and inclination of the kink K in the light distribution pattern and consequently the desired elevation of the right part of the cut-off edge coE in comparison to its left part (see FIG. 9) is obtained in the target area of the projection system.

Of course it is not necessary that the first and the second portion 1*a*, 1*b* of the light source unit extend parallel to each other and in a horizontal direction. If it is desired that in FIG. 9 the cut-off edge coE left and/or right of the kink K has a certain inclination in a vertical direction, the first and/or the second portion 1*a*, 1*b* of the light source unit is accordingly inclined in a vertical direction as well.

Further, such a kink K can also be generated by means of the embodiments shown in FIGS. 2 to 5 if the related line array or matrix array of collimators 12 is provided with an offset edge of as explained above.

Generally, the walls 121, 122, 123, 124 of the collimators 12 and the first and the second reflective shield 125, 126 are disclosed above to be planar walls and planar shields, respectively. This is advantageous especially for manufacturing reasons and for ease of dimensioning the related collimators and shields. However, a part or all of such walls 121, 122, 123, 124 and/or shields 125, 126 could also be curved walls and shields, respectively, in order for e.g. optimizing the collimators 12 with respect to a certain pattern of the radiated light intensity of the light source or light emitting surface at the entry aperture of the collimators 12, and/or for achieving a certain optimized distribution of the light intensity in the target area.

Further, instead of two or more of the collimators 12 of the light source unit 1, a common collimator could be used having e.g. an accordingly rectangular aperture extending in a longitudinal direction instead of the preferred square aperture as indicated in FIGS. 1, 6 and 7.

While the invention has been illustrated and described in detail in the drawings and foregoing description, such illustration and description are to be considered illustrative or exemplary and not restrictive, and the invention is not limited to the disclosed embodiments. Variations to embodiments of the invention described in the foregoing are possible without departing from the scope of the invention as defined by the accompanying claims.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A lighting system comprising:

a light source unit and a projection system for generating a predetermined light pattern in a target area, wherein the light source unit comprises at least one light source and a plurality of collimators which are arranged side by side in the form of an array comprising a number of lines, each seen in a projection plane perpendicular to the optical axis of the projection system, and each collimator comprising an entry aperture through which light emitted by the at least one light source enters the collimator and light reflecting surfaces for reflecting and directing the light entered into the collimator through an exit aperture of the collimator and into the projection system, wherein the collimators are configured such that either the exit aperture of the collimator, or at least one of front rims of the light reflecting surfaces of the collimators which enclose and mark the boundary of the exit aperture of each of the collimators are at least substantially coincident with and at least substantially follow at least a part of a curved focal plane (P) of the projection system, or are configured such that the curved focal plane (P) of the projection system intersects with or tangentially touches the exit aperture or at least one of the rims, respectively.

2. Lighting system according to claim 1, wherein the at least one light source is a Lambertian light source having a Lambertian light radiation characteristic.

3. Lighting system according to claim 1,wherein the collimators are shifted parallel to each other and in a direction parallel to the optical axis (A) of the projection system such that the curved focal plane (P) of the projection system intersects with or tangentially touches the exit apertures of the collimators.

4. Lighting system according to claim 1,wherein the surfaces of the collimators extend in the direction towards the projection system up to the curved focal plane (P).

5. Lighting system according to claim 1,wherein the collimators are tilted in relation to the optical axis (A) of the projection system such that the light beams which leave the exit apertures of the collimators are aimed at a center area or an entry aperture of the projection system.

6. Lighting system according to claim 1, wherein the collimators are dimensioned such that their entry apertures are arranged in a common planar plane.

7. Lighting system according to claim 6, wherein the second reflective shield extends substantially in the same direction as the wall of the collimator at which it is arranged.

8. Lighting system according to claim 1, wherein the light source unit comprises a first portion and a second portion, wherein each portion comprises a first and a second number of collimators, respectively, which are each arranged in the form of a first and a second line array, respectively, and wherein these line arrays are offset parallel to each other in a direction perpendicular to the extension of the line arrays and perpendicular to the optical axis of the projection system.

9. Light source unit comprising a plurality of collimators which are arranged adjoining side by side in the form of a line array or a matrix array of collimators and which light source unit is adapted for use in a lighting system according to claim 1.

10. Light source unit according to claim 9, wherein entry apertures of the collimators are arranged in a common planar plane, and wherein each at least one LED is arranged in the entry aperture of each collimator which LEDs are mounted on a common printed circuit board.

11. Lighting system according to claim 1, wherein the plurality of collimators are arranged adjoining side by side in the form a line array or in the form of a matrix array.

12. Lighting system according to claim 1, wherein the light reflecting surfaces are walls or planes having a planer or curved surfaces.

13. A lighting system comprising:

a light source unit and a projection system for generating a predetermined light pattern in a target area, wherein the light source unit comprises at least one light source, and a plurality of collimators which are arranged side by side in the form of an array comprising a number of lines, each seen in a projection plane perpendicular to the optical axis (A) of the projection system, and each collimator comprising an entry aperture through which light emitted by the at least one light source enters the collimator and light reflecting surfaces for reflecting and directing the light entered into the collimator through an exit aperture of the collimator and into the projection system, wherein the light source unit comprises at least one of a first and a second reflective shield, wherein the first reflective shield being arranged along a first side of the exit apertures of the collimators and extending between the collimators and the projection system and having a front rim opposite to the projection system, wherein the front rim having a curved course corresponding to the curved focal plane (P) of the projection system and being coincident with and substantially following this curved focal plane (P), and wherein the exit apertures of the collimators are accordingly distant from the focal plane (P) of the projection system and by this out-of-focus of the projection system and wherein the second reflective shield being arranged at a second side of the exit aperture of the at least one collimator and extending between the collimators and the projection system and having a front rim opposite to the projection system, wherein the front rim is positioned between the projection system and its curved focal plane (P).

14. Lighting system according to claim 13,wherein the first reflective shield (125) extends in a direction parallel to the optical axis (A) of the projection system.

15. Lighting system according to claim 13, wherein the plurality of collimators are arranged adjoining side by side in the form a line array or in the form of a matrix array.

16. Lighting system according to claim 13, wherein the light reflecting surfaces are walls or planes having a planer or curved surfaces.

* * * * *